United States Patent
Wu et al.

(10) Patent No.: US 7,161,927 B2
(45) Date of Patent: Jan. 9, 2007

(54) SYSTEM AND METHOD FOR SYNCHRONIZING MULTIUSER SIGNALS FOR OFDM CDMA

(75) Inventors: Shan-Tsung Wu, Taipei (TW); Kwang-Cheng Chen, Hsinchu (TW)

(73) Assignee: Mediatek Inc., Hsinchu (TW)

( * ) Notice: Subject to any disclaimer, the term of this patent is extended or adjusted under 35 U.S.C. 154(b) by 1030 days.

(21) Appl. No.: 10/127,190

(22) Filed: Apr. 9, 2002

(65) Prior Publication Data

US 2003/0002433 A1    Jan. 2, 2003

Related U.S. Application Data

(60) Provisional application No. 60/284,437, filed on Apr. 18, 2001.

(51) Int. Cl.
*H04B 7/216*    (2006.01)

(52) U.S. Cl. .................................... 370/342

(58) Field of Classification Search ............... 370/335, 370/342; 375/141–148, 136, 152
See application file for complete search history.

(56) References Cited

U.S. PATENT DOCUMENTS

| | | | |
|---|---|---|---|
| 5,719,899 A * | 2/1998 | Thielecke et al. ............ | 375/144 |
| 6,067,292 A * | 5/2000 | Huang et al. ................ | 370/342 |
| 6,178,194 B1 * | 1/2001 | Vasic .......................... | 375/136 |
| 6,285,861 B1 * | 9/2001 | Bonaccorso et al. ........ | 455/137 |
| 6,370,397 B1 * | 4/2002 | Popovic et al. .............. | 455/561 |
| 6,373,882 B1 * | 4/2002 | Atarius et al. ............... | 375/148 |
| 6,507,605 B1 * | 1/2003 | Fukumoto et al. ........... | 375/152 |
| 6,920,192 B1 * | 7/2005 | Laroia et al. ................ | 375/347 |

OTHER PUBLICATIONS

Kwang-Cheng Chen and Shan-Tsung Wu, "A Programmable Architecture for OFDM-CDMA", IEEE Communications Mag., Nov. 1999, pp. 76-82.
Shan-Tsung Wu and Kwang-Cheng Chen, "Orthogonal Frequency CDMA for Broadband Communications", IEEE, 1999, pp. 2890-2894.
Shan-Tsung Wu and Kwang-Cheng Chen, "Programmable Multiuser Detection for OFDM-CDMA", IEEE, 2000, pp. A-1-A-5.
Cha'o-Ming Chang and Kwang-Cheng Chen, "Joint Linear Timing and Carrier Phase Estimation of DS-CDMA Multiuser Communications", IEEE Journal on Selected Areas in Communications, vol. 18, No. 1, Jan. 2000, pp. 87-98.
Shinsuke Hara and Ramjee Prasad, "Overview of Multicarrier CDMA", IEEE Communications Mag., Dec. 1997, pp. 126-133.

(Continued)

*Primary Examiner*—Doris H. To
*Assistant Examiner*—Thai Hoang
(74) *Attorney, Agent, or Firm*—Thomas, Kayden, Horstemeyer & Risley

(57) ABSTRACT

A system and a method for deriving transmitted signals from multiple users for an OFDM-CDMA communication system are described herein. An optimum synchronizer for use in an OFDM-CDMA system is also provided. In one aspect, the system and method incorporate a programmable structure for different OFDM-CDMA systems (e.g., MC-CDMA, MC-DS-CDMA, and MT-CDMA) that can be efficiently implemented. The programmable structure is based on the linear minimum mean square error (LMMSE) or best linear unbiased estimator (BLUE) techniques. In addition, an efficient algorithm for reducing computations of fast Fourier transform (FFT) is presented.

19 Claims, 6 Drawing Sheets

OTHER PUBLICATIONS

Stephen E. Bensley and Behnaam Aazhang, "Subspace-Based Channel Estimation for Code Division Multiple Access Communication Systems", IEEE Transactions on Communications, Aug. 1996, pp. 1009-1020.

Todd K. Moon et al., "Parameter Estimation in a Multi-User Communication System", IEEE Transaction on Communications, Aug. 1994, pp. 2553-2560.

Essam A. Sourour and Masao Nakagawa, "Performance of Orthogonal Multicarrier CDMA in a Multipath Fading Channel", IEEE Transactions on Communications, Mar. 1996, pp. 356-367.

Cha'o-Ming Chang and Kwang-Cheng Chen, "Joint Linear Timing and Carrier Phase Estimation of DS-CDMA Multiuser Communications", IEEE, 1999, pp. 1521-1525.

L. Vandendorpe, "Multitone Spread Spectrum Multiple Access Communications System in a Multipath Rician Fading Channel", IEEE Transactions on Vehicular Technology, May 1995, pp. 327-337.

R. Michael Buehrer et al. "A simulation Comparison of Multiuser Receivers for Cellular CDMA", IEEE Transactions on vehicular Technology, Jul. 2000, pp. 1065-1085.

\* cited by examiner

SYSTEM AND METHOD FOR SYNCHRONIZING MULTIUSER SIGNALS FOR OFDM CDMA

CROSS-REFERENCE TO RELATED APPLICATIONS

The present patent application relates to, and claims the priority of, U.S. Provisional Patent Application Ser. No. 60/284,437 filed on Apr. 18, 2001, having common inventorship as the present application.

FIELD OF THE INVENTION

The present invention generally relates to a communication system and method, and more particularly to a system and method for deriving and synchronizing multiple signals for an Orthogonal Frequency Division Multiplexing Code Division Multiple Access (OFDM-CDMA) communications system.

DESCRIPTION OF THE RELATED ART

In high-rate code division multiple access (CDMA) communications, signals are subject to frequency selective fading and therefore severe multiple access interference (MAI), unless a more complicated equalizer or equivalence is adopted. Technologies that combine orthogonal frequency division multiplexing (also known as Multi-Carrier Modulation) with CDMA have been proposed to overcome the aforementioned shortcomings in the art, including, e.g., Multi-Carrier CDMA (MC-CDMA), Multi-Carrier Direct Sequence CDMA (MC-DS-CDMA), and Multi-Tone CDMA (MT-CDMA).

A unified framework, namely the Orthogonal Frequency CDMA (OFCDMA), has been derived by the inventors of the present application for the MC-CDMA, MC-DS-CDMA and MT-CDMA). See "Orthogonal Frequency CDMA for Broadband Communications", Proc. IEEE Fall Vehicular Technology Conference, Amsterdam, 1999, pp. 2890–2894. In addition, a programmable transceiver architecture based on the unified framework has been developed by the inventors of the present application for OFDM CDMA. See "A Programmable Architecture for OFDM-CDMA," IEEE Communication Mag., November 1999, pp. 76–82. A programmable multiuser detection structure is also proposed by the inventors of the present application to enhance the performance of the programmable OFDM-CDMA receiver. See "Programmable Multiuser Detection for OFDM-CDMA", IEEE Publication No. 0-7803-7244-1/01, 2001, where the timing, amplitudes and carrier phases for the multiple users are assumed to be readily available. In reality, however, it is desirable that timings, amplitudes, carrier phases are to be estimated as correctly as possible. The process to realize this is called synchronization.

The performance of multi-user detectors is highly sensitive to timing jitter. It is desirable that the timing, amplitudes, carrier phases are to be estimated in a synchronization process as accurately as possible. Moreover, synchronization in a high-power signaling environment may cause serious interference with lower-powered signals, which is a further complication in addition to severe multiple access interference (MAI). Although multi-user synchronization techniques for CDMA have been proposed in the art, e.g., in "Joint Linear Timing and Carrier Phase Estimation of DS-CDMA Multiuser Communications, IEEE JSAC, January 2000, pp. 87–98, by C. M. Chang and Kwang-Cheng Chen), a general multi-user synchronization structure for the specific use of OFDM-CDMA has not been presented.

Therefore, there is a general need in the art for an effective synchronization method for general use in Orthogonal Frequency Division Multiplexing (OFDM) CDMA communications.

SUMMARY OF THE INVENTION

Accordingly, one aspect of the present invention is to provide an optimum synchronizer for use in an OFDM-CDMA system with multi-ray fading channels. Another aspect of the present invention is to provide a system and method for deriving transmitted signals from multiple users in an OFDM-CDMA communications system. In a further embodiment according to the invention, a programmable structure for various combinations of OFDM and CDMA systems (e.g., MC-CDMA, MC-DS-CDMA and MT-CDMA) that can be efficiently implemented is also provided.

According to a preferred embodiment of the invention, an exemplary programmable synchronizer comprises two parts. The first part includes a programmable structure serving as a preprocessor for generating a plurality of digital samples called sufficient statistics. A second part serving as a postprocessor processes the sufficient statistics generated from the preprocessor to obtain the desired timing, phases and amplitudes. According to the invention, the postprocessor can be implemented using interference cancellation techniques such as linear minimum mean square error (LMMSE) or best linear unbiased estimator (BLUE). Moreover, an efficient algorithm for reducing the number of fast Fourier transform (FFT) computations is also provided.

In a further exemplary embodiment according to the invention, a system and a method for deriving a plurality of output signals from a plurality of corresponding received signals in an OFDM-CDMA communication system are provided. The received signals are processed with respect to the dispreading, interpolation, sampling, shift windowing and FFT therefor, with a programmable synchronization structure modified from a programmable OFDM-CDMA receiver to produce a plurality of output signals. At least one of a plurality of synchronization parameters is derived with a linear programmable multiuser synchronization structure in response to the output signals. The output signals are detected by a programmable multiuser detector, in response to at least one of the synchronization parameters derived from the synchronization structure.

BRIEF DESCRIPTION OF THE DRAWINGS

The preferred and other embodiments of the invention are further described in detailed below in conjunction with the accompanying drawings (not necessarily drawn to scale), in which.

DETAILED DESCRIPTION OF THE PREFERRED EMBODIMENTS

Figure 1:
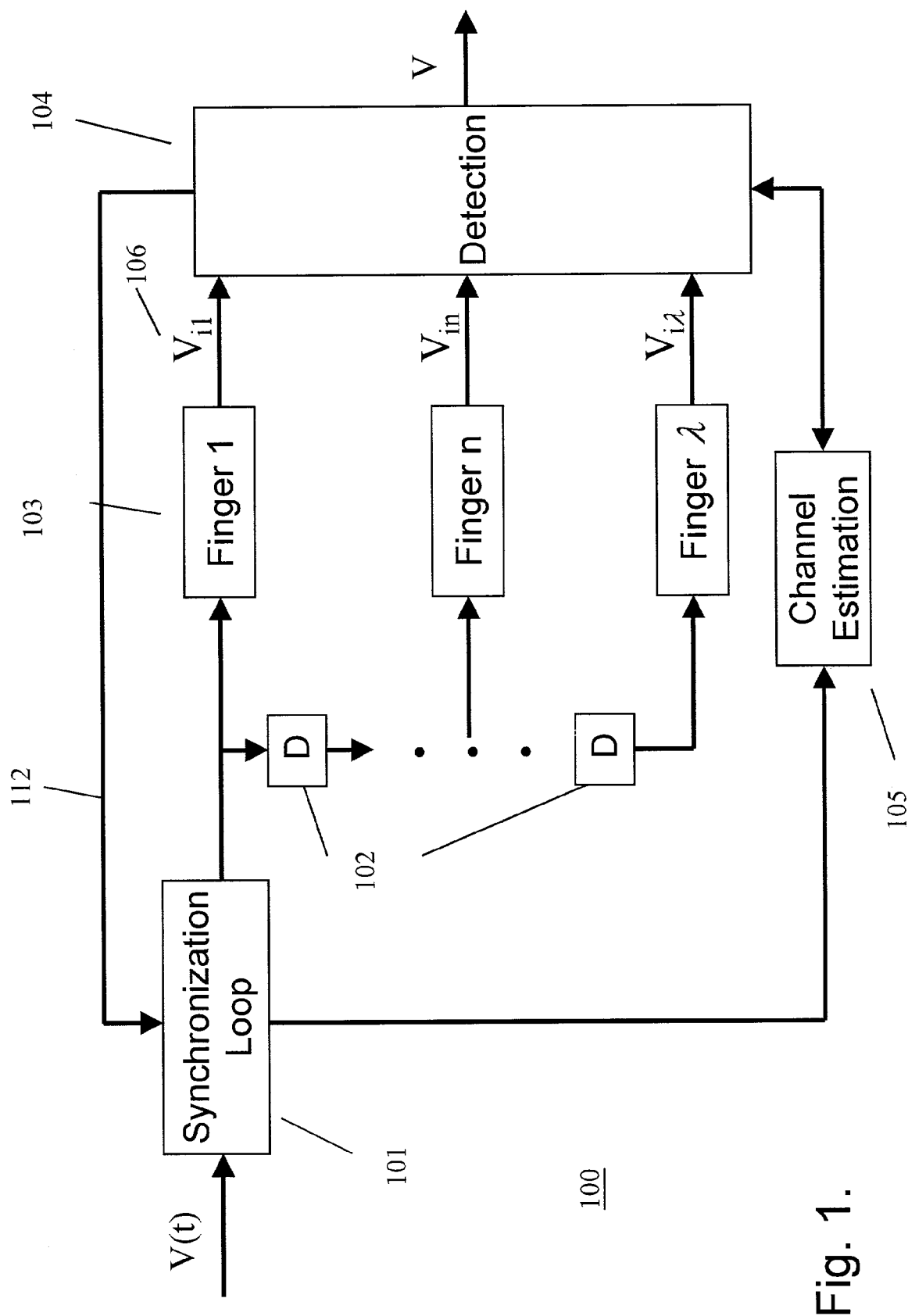
FIG. 1 is an exemplary block diagram illustrating an OFDM-CDMA RAKE receiver structure for the ith user.

In a general OFDM-CDMA system, signals are represented by their low pass equivalent envelopes. Accordingly, the transmitted signal for the $k^{th}$ user is represented as:

$$S_k(t) = (2a_k lJM)^{1/2} \sum_{j=1}^{J} \sum_{m=1}^{M} \sum_{p=-P}^{P} b_{kj}(t) c_{km}(t-pT) e^{iw_{jm}t}$$

where $a_k$ is the transmission power, $b_{kj}(t)$ is the information-bearing signal on the $(jm)^{th}$ subcarrier $e^{iw_{jm}t}$; $c_{km}(t)$ is the signature waveform for the $(jm)^{th}$ subcarrier with duration T. There are generally 2P+1 transmitted symbols on each subchannel for each user having a number of subcarriers, JM. Per the respective indices j and m for the independent and dependent subcarriers, the subcarrier $e^{iw_{jm}t}$ carries the independent information for the different indices j and the identical information for all dependent indices m.

The transmission signal for the $k^{th}$ user on the $(jm)^{th}$ subchannel is subject to a L-ray Rayleigh fading channel with channel impulse response $$h_{kjm}(t) = \sum_{l=1}^{L} g_{kjml} \delta(t - t_{kl}).$$

The channel coefficients $g_{kjlml}$ are represented by zero-mean complex Gaussian random variables, with $t_{kl} \in [(l-1)T_c, lT_c]$ representing the delay corresponding to the $l^{th}$ ray of the transmission signal for the $k^{th}$ user. As $b_{kj}[p]$ represents the $p^{th}$ symbol of the $b_{kj}(t)$ whereas K represents the number of users, the received signal at the base station is represented by:

$$v(t) = \sum_{k=1}^{K} \sum_{j=1}^{J} \sum_{l=1}^{L} \sum_{m=1}^{M} \sum_{p=-P}^{P} \beta_{kjml} b_{kj}[p] c_{km}(t - pT - \tau_k - t_{kl}) e^{iw_{jm}t} + \eta(t), \quad (0)$$

where $\beta_{kjml} \equiv (2a_k lJM)^{1/2} g_{kjml}$, $\tau_k$ is the timing of user k, and the phase shift $-w_{jm}(\tau_k + t_{kl})$ into $g_{kjml}$. $\eta(t)$ is a zero-mean complex additive White Gaussian noise (AWGN) process with a variance $\sigma^2$.

Using block matrix notational construction, a variable with less subscripts represents a block vector (a bold-faced lowercase letter) constructed from itself with more subscripts by sequencing the additional ones. For example, $x_{km}$ is a larger dimensional vector constructed from a smaller dimensional vector $x_{kjml}$ by:

$$x_{km} = [x_{k1m1}^T, \ldots x_{kJm1}^T, x_{k1m2}^T, \ldots x_{kJmL}^T]^T.$$

Moreover, $R_{km,k'm'}$ is a larger dimensional matrix constructed from a smaller dimensional matrix $R_{kjml,k'j'm'l'}$ by:

$$\begin{bmatrix} R_{k1ml,k'1m'1} & \cdots & R_{k1ml,k'Jm'1} & \cdots & R_{k1ml,k'Jm'L} \\ \vdots & \ddots & \vdots & \ddots & \vdots \\ R_{kJml,k'1m'1} & & R_{kJml,k'Jm'1} & \cdots & R_{kJml,k'Jm'L} \\ \vdots & \ddots & \vdots & \ddots & \vdots \\ R_{kJmL,k'1m'1} & \cdots & R_{kJmL,k'Jm'1} & \cdots & R_{kJmL,k'Jm'L} \end{bmatrix}$$

Among the subscripts, a lowercase letter (e.g., k or k') represents the index of the elements while the capital letter (e.g., K) represents the total number of the corresponding elements.

Provided that a training interval $T_t$ is sufficiently brief ($T_t \ll 1/f_D$, where $f_D$ is the Doppler frequency) such that the timing, phases, and amplitudes remain constant during the training period, based on the maximum likelihood criterion, the optimum estimator for the synchronization parameters β and τ can be obtained by:

$$\arg \max_{\hat{\beta},\hat{\tau}} Pr(v(t)|\beta, \tau, d[p]). \quad (1)$$

where β represents an amplitude matrix, τ represents a timing vector, and d[p] represents a training sequence vector constructed from a pre-designed sequence $d_{kj}[p]$ which replaces $b_{kj}[p]$ in (0).

A two-stage timing recovery can be adopted for providing solutions to equation (1), i.e., by acquisition and tracking. Acquisition can be used to coarsely estimate the possible timing interval. Thereafter, in order to derive the precise timing, gradient-based searching algorithms can be used for tracking.

In regard to the timing acquisition, as $\zeta_{kjmlu} \equiv \beta_{kjml} \delta_{\psi_u, Tk}$, $\delta_{x,y}$ is defined by:

$$\delta_{x,y} = \begin{cases} 1 & \text{if } x = y. \\ 0 & \text{otherwise.} \end{cases}$$

Under discrete timing assumption (DTA), $\tau_k$ belongs to a finite set $\{\psi_u: u=1, 2, \ldots U\}$, and $t_{kl}=(l-1)T_c$, equation (1) consequently becomes arg $$\max_{\hat{\beta}\hat{\tau}} \Omega(\zeta),$$

where $$\Omega(\zeta) = \quad (2)$$

$$2\text{Re}\left\{\sum_{p=-P}^{P} \zeta^H D^H[p] v[p]\right\} - \sum_{p=-P}^{P} \sum_{p'=-P}^{P} \zeta^H D^H[p] R[p-p'] D[p'] \zeta.$$

where $(.)^H$ denotes the conjugate transpose operation of a matrix, and Re(.) denotes the real part of a complex number.

The KJMLU×1 observation vector v[p] is constructed from $$v_{kjmlu}[p] = \int_{-\infty}^{+\infty} v(t)c_{km}^*(t-pT-\psi_u-t_{kl})e^{-iw_{jm}t}dt, \quad (3)$$

where (.)* denotes the complex conjugate, the indices k is used for the number of users, j for the number of independent subcarriers, m for the number of dependent subcarriers, l for the number of rays and u for the number of possible timing instants. A prime notation is also used in matrices if necessary, such as k' j' m' l' u'. The KJMLU×KJMLU correlation matrix R{p−p'} is constructed from:

$$R_{kjmlu,k'j'm'l'u'}[p-p'] =$$
$$\int_{-\infty}^{+\infty} c_{km}^*(t-pT-\psi_u-t_{kl})c_{k'm'}(t-p'T-\psi_{u'}-t_{k'l'})e^{-i(w_{jm}-w_{j'm'})t}dt. \quad (20)$$

The reference matrix D[p]=diag(D'[p],D'[p], . . . ,D'[p]) is a KJMLU×KJMLU diagonal matrix in which D'[p] is a KJ×KJ diagonal matrix constructed from the training sequences $d_{kj}[p]$.

As ζ=Bδ (by $\zeta_{kjmlu} \equiv \beta_{kjml}\delta_{\psi_u,\tau_k}$) in equation (2), if the diagonal amplitude matrix B is known in advance, the maximum likelihood sequence detection (MLSD) technique can be applied to search for all possible δ such that equation (2) is maximized. Conversely, if the timing δ is known in advance, the amplitude B can be estimated using equation (2). An algorithm is henceforth developed for recursively estimating δ and B. Furthermore, the MLSD technique can be applicable if the amplitudes are assumed to be discrete-valued such that the number of possible values of ζ is finite. After ζ is estimated as, e.g., $\hat{\zeta}$, $\hat{\tau}$ and $\hat{\beta}$ are obtained by:

$$\hat{u}_k = \arg\max_u |\zeta_{ku}|, \hat{\tau}_k = \psi_{\hat{u}_k}, \hat{\beta}_{kjml} = \zeta_{kjml\hat{u}_k}, \quad (4)$$

Under the discrete timing assumption (DTA), the performance function Ω(ζ) becomes a quadratic form. A linear programmable multiuser synchronization structure is derived, which is described herein and below in further detail.

What is needed for multiuser synchronization can be acquired from the received signal v(t) via a programmable OFDM-CDMA receiver for a single user, which is shown in FIG. 1. In accordance with the principles of the present invention, a generalized synchronizer can be programmed for different types of multiuser OFDM-CDMA systems, which is described in further detail below.

Per equation (3), v[p] can be expressed as:

$$v[p] = \sum_{p'=-P}^{P} R[p-p']D[p']\zeta + \eta[p]. \quad (5)$$

by linearly combining the sufficient statistics $v_{kjmlu}[p]$. R and D represent KJMLU(2P+1)×KJMLU(2P+1) matrices with $R_{p,p'}=R[p-p']$, $D_{p,p'}=\delta_{p,p'}D[p]$. η represents a KJMLU(2P+1)×1 vector with $\eta_p=\eta[p]$. J=[1, 1, . . . 1]$^T$ represents a KJMLU(2P+1)×KJMLU matrix constructed from the KJMLU×KJMLU identity matrix I. Thus, $E[\eta[p]\eta[p']^H]=\sigma^2 R[p-p']$ and henceforth $E[\eta\eta^H] \approx \sigma^2 R$. Equation (5) can then be expressed as:

$$v=RDJ\zeta+\eta. \quad (6)$$

For single-user systems, the optimum estimator, based on maximizing the signal-to-noise ratio (SNR), is represented by:

$$\hat{\zeta}=J^H D^H v \quad (7)$$

which is the maximum ratio combining (MRC) of v.

For multiuser systems, as A serves as a linear operator such that $\hat{\zeta}$=Av, the LMMSE estimator is:

$$A_{MS}=(J^H D^H RDJ+\sigma^2 C_\zeta^{-1})^{-1} J^H D^H, \quad (8)$$

where $C_\zeta = E[\zeta\zeta^H]$. The BLUE is represented by:

$$A_{BL}=(J^H D^H RDJ)^{-1} J^H D^H. \quad (9)$$

$A_{MS}$ and $A_{BL}$ require v, R, $C_\zeta$, and D. R and D can be stored in a database. $C_\zeta$ can be estimated or empirically assigned at the first moment and then adaptively tracked. As the process for obtaining v is programmable, then the two estimation approaches for ζ are also programmable. For a multiuser synchronization structure, ζ can be processed by equation (4). In addition, v can be produced from v(t) via a programmable OFDM-CDMA structure with a sequence of shifted v(t), that is, v(t+ψ$_v$+t$_n$).

Figure 2:
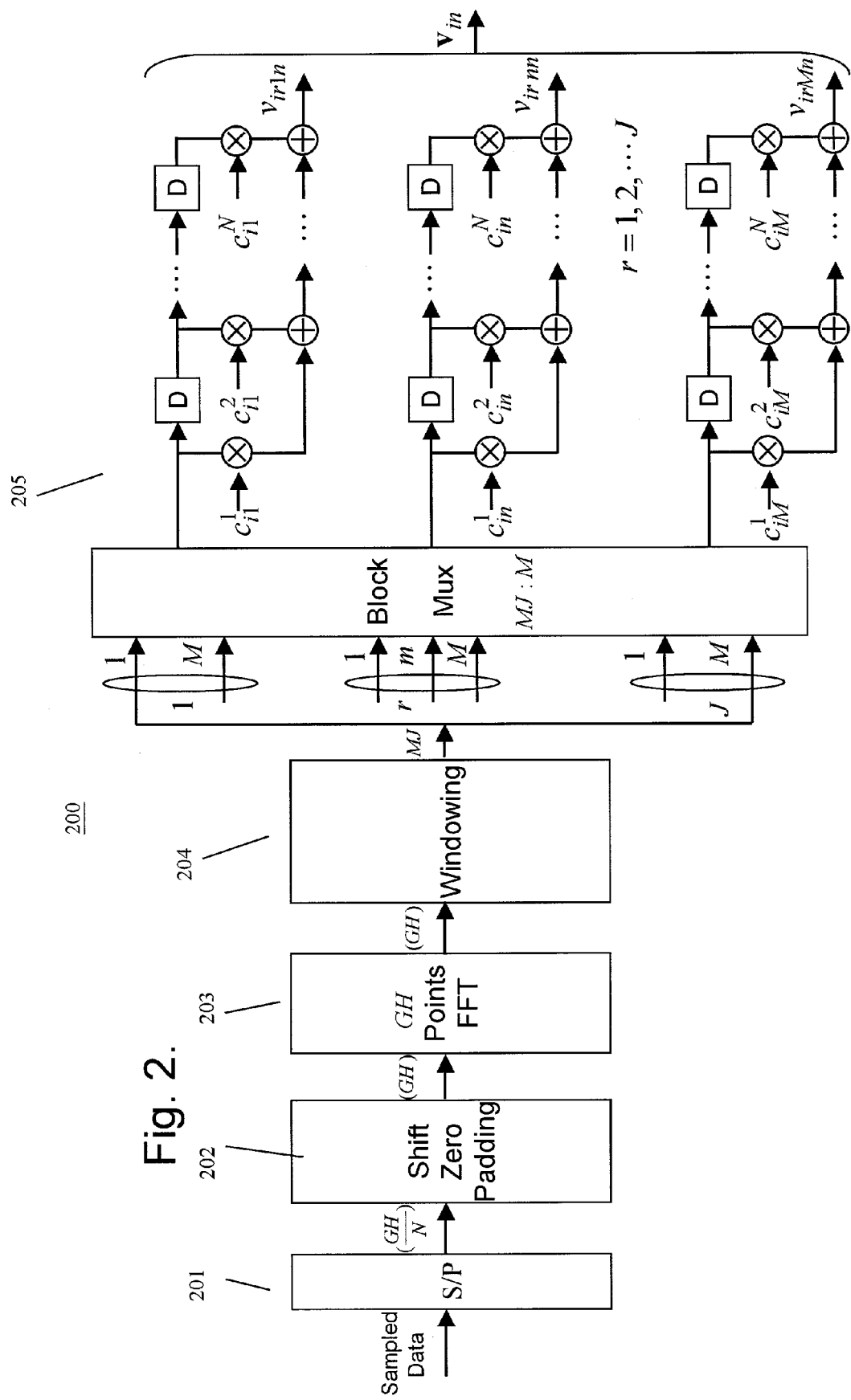
FIG. 2 is an exemplary block diagram illustrating a finger of an OFDM-CDMA RAKE receiver as shown in FIG. 1.
Figure 3:
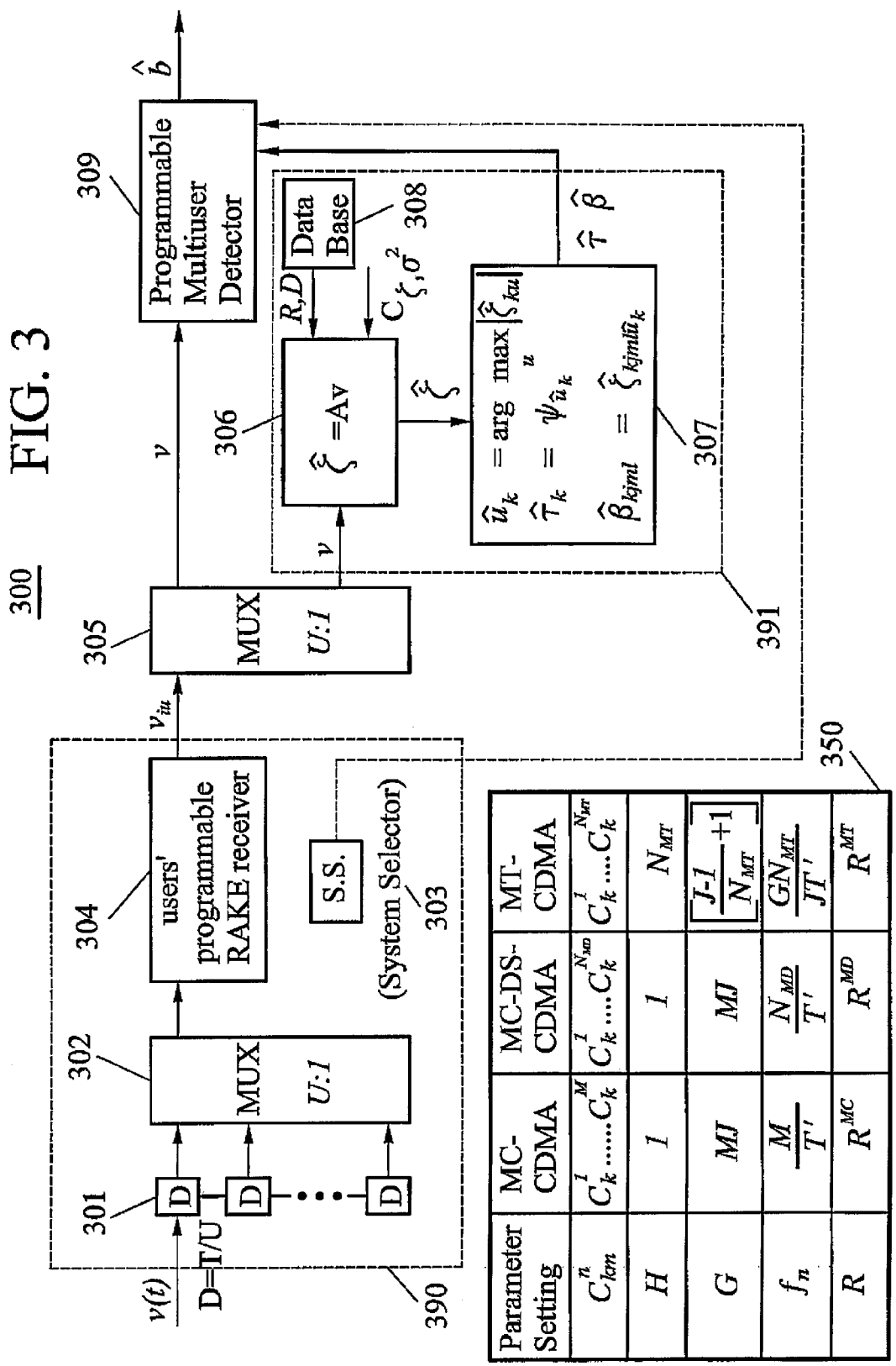
FIG. 3 is a block diagram illustrating an exemplary system for processing signals for OFDM-CDMA, including a preprocessor and a postprocessor of a programmable synchronizer, and a programmable detector in accordance with the invention.

The RAKE receiver can be used as the i$^{th}$ user's RAKE receiver for an exemplary synchronization architecture according to the present invention (as shown in FIG. 3) is discussed in further detail below. The programmable OFDM-CDMA receiver is depicted in FIG. 1 where the n$^{th}$ finger for the receiver is shown in FIG. 2.

FIG. 1 is a block diagram that illustrates an exemplary receiver for use in a system according to the present invention. Receiver 100 comprises a synchronous circuit 101 that processes a plurality of received signals, and also receives a feedback signal 112 for synchronizing with a detected signal. The output of the synchronous circuit 101 is coupled to a plurality of delay elements 102 (with a total number U) for delaying the plurality of received signals so as to separate the multipath signals. The delayed signals are then coupled to the respective fingers 103.

Each of the fingers 103 receives a respective delayed signal where the respective delayed signals are processed so as to generate a plurality of output signals 106. A detector 104 receives the plurality of output signals 106 from the plurality of fingers 103 where the plurality of output signals are further processed for detecting the possible values of the transmission symbols (which are either 1 or 0). A channel estimator 105 serves to provide an estimation of the channel coefficients for the users to the detector 104.

FIG. 2 is a block diagram that illustrates an exemplary finger for used in the receiver of FIG. 1 in further detail. The received signals pass through an analog-to-digital converter (not shown) for controlling a sample rate of the received OFDM-CDMA multiplexed signals. The analog to digital converter (ADC) converts the input analog signals into a digital sequence therefor and outputs that digital sequence. The sampled data shown in FIG. 2 represent the output digital sequence.

A serial-to-parallel converter 201 serves to receive the digital sequence from the ADC, and to determine a ratio in serial-to-parallel conversion based on the type of OFDM-CDMA that is selected, (e.g., according to the ratio GH/N).

The serial to parallel converter 201 then converts the serial data into a plurality of parallel data and outputs the parallel data to a shift zero padding device 202.

A shifting zero padding device 202 serves to pad zeros to the converted parallel data from 201. The original GH/N samples are zero-padded to GH samples and then those GH samples are shifted in an end-round manner by nGH/N samples. With an initial value of 0 for n, n is incremented by 1 every time the zero padding is performed until n reaches N where n is reset to zero again. A fast Fourier transform (FFT) processor 203 having GH points serves to receive the zero-padded parallel data from the shift zero padding device 202. The FFT processor 203 performs an FFT operation on the zero-padded parallel data to form a plurality of transformed data and outputs them to a windowing sample filter 204. The windowing sample filter 204 serves to receive the plurality of transformed data output from the FFT processor 203. The purpose of sample filter 204 is to select the first MJ samples out of the GH samples from the transformed data output by the FFT processor 203.

A despreader 205 serves to receive outputs from the sample filter 204, and to despread each output of the sample filter 204 in response to the selected scenario by multiplying a plurality of the despreading codes. Despreader 205 outputs a plurality of despread signals. Further, the despreader 205 serves to determine the despreading codes for a plurality combinations of OFDM and CDMA.

In the RAKE receiver 100 of FIG. 1, each of the fingers 103 can be programmed to operate in a plurality of combinations of OFDM and CDMA systems (e.g., MC-CDMA, MC-DS-CDMA, and MT-CDMA) by setting the relevant parameters shown in table 350 of FIG. 3. The definitions of these parameters are shown in FIG. 2. The RAKE receiver of FIG. 1 and a communications system based thereon can also be programmed to operate in any combinations of OFDM and CDMA, including the aforementioned multicarrier CDMA modes.

As particularly shown in FIG. 2, the synchronized signals are sampled at a rate $f_s = G/T_c$. After each serial-to-parallel conversion, the GH/N samples are shifted and zero-padded to the GH samples. That is, the GH/N samples are zero-padded to the GH samples and end-roundly shifted by nGH/N samples for n=0, 1, ... N−1, where $$G = \left[(MJ-1)\frac{T_o}{T_c} + 1\right] \text{ and } H = \frac{T_o}{T_c}.$$

A GH-point FFT 203 is then performed. After the signal processing at the windowing device 204, only the first MJ parallel branches are block-multiplexed to M tapped-delay-lines with weightings $C_{is}''$ for despreading. Replacing v(t) with $v(t-\psi_v)$, the final outputs $V_{irsn}$ correspond to $V_{kjmlu}$ defined in equation (3).

FIG. 3 is a block diagram that illustrates an exemplary embodiment of an OFDM-CDMA system comprising a programmable multiuser synchronizer according to the principles of the present invention. The system as shown in FIG. 3 is capable of deriving transmitting signals from corresponding signals at a receiving end of an OFDM-CDMA communications system. In particular, the exemplary synchronizer according to the invention comprises a linear programmable multiuser synchronization structure, utilizing the programmability of the RAKE receiver as shown in FIG. 1.

The synchronization of the communications system 300 in FIG. 3 is performed by jointly estimating of the timing, carrier phases, and amplitudes therein. The system 300 in FIG. 3 comprises three parts, namely a preprocessor 390 for a programmable multiuser synchronizer, a postprocessor 391 for the multiuser synchronizer, and a programmable multiuser detector 309. The preprocessor 390 is modified from a plurality of programmable receivers for the users and serves to generate an observation vector v in equation (5). During the training period when synchronization is performed, the programmable multiuser detector 309 is not activated as the observation vector v is exported to the postprocessor 391. The postprocessor 391 serves to estimate $\zeta$ by $\hat{\zeta}=Av$ where A is a matrix that can be represented by either equations (8) or (9). After $\hat{\zeta}$ is estimated, the timing $\hat{\tau}$ and complex amplitude $\hat{\beta}$ are obtained using equation (4). When the synchronization is complete, the observation vector v is exported to the programmable multiuser detector 309 for detection of the transmitted information bits.

The communications system as shown in FIG. 3 includes the processing of indices of the dependent subcarriers, m, indices of independent subcarriers, j, a predetermined transmission power level $a_k$ responsive to a selective user k, a plurality of information-bearing signals, $b_{kj}(t)$, responsive to a selective user k, a plurality of signature waveforms, $c_{km}(t)$, with a duration T for predetermined subcarriers, a number of transmitted symbols for each subcarrier for each user, 2P+1, and a number of subcarriers, jm.

A plurality of delay elements 301 serve to delay the received signal with a delaying time of T/U, where U is the number of the delay elements. The U:1 multiplexer (MUX) 302 serves to transform U parallel data streams fed from 301 to a serial output stream. The serial output stream is then exported to the programmable multiuser receiver 304 for all users.

A system designator 303 generates a selection signal for configuring the system to MC-CDMA, MC-DS-CDMA or MT-CDMA. The selection signal is used to program programmable RAKE receiver 304 for all users, as well as the programmable multiuser detector 309.

The programmable RAKE receiver 304 has generally the same structure as that shown in FIG. 1 and receives a selected output from the multiplexer 302. It also despreads the selected output without considering channel coefficients and timing of the users.

A second multiplexer 305 is used for collecting all inputs from the fingers of the programmable RAKE receivers 304 for all users where an observation vector v is then produced. A linear optimum estimator 306 receives the observation vector v and generates an estimation of $\zeta$ from v by $\hat{\zeta}=Av$ where A is a matrix can be either equations (8) or (9).

A database 308 receives items generated from the signature waveform with a duration T for (jm)th subcarriers and transmitted symbols on each subchannel for each user and the number of subcarriers. R, D are a KJMLU(2P+1)× KJMLU(2P+1) matrices with $D_{p,p'}=\delta_{p,p'}D[p]$, and the reference matrix $D[p]=\text{diag}(D'[p],D'[p], \ldots, D'[p])$ is a KJMLU×KJMLU diagonal matrix in which D'[p] is a KJ×KJ diagonal matrix constructed from a training sequences $d_{kj}[p]$. R is a correlation matrix. The programmable multiuser detector 309 receives despread signals from multiplexer 305 for deriving estimated original transmitting signals in response to outputs from the linear estimator 306. The programmable multiuser detector 309 of FIG. 3 can also be programmed with the same parameters for use in the receiver 304 in order to configure the detector to operate in one of the multicarrier modes MC-CDMA, MC-DS-CDMA and MT-CDMA.

Figure 4:
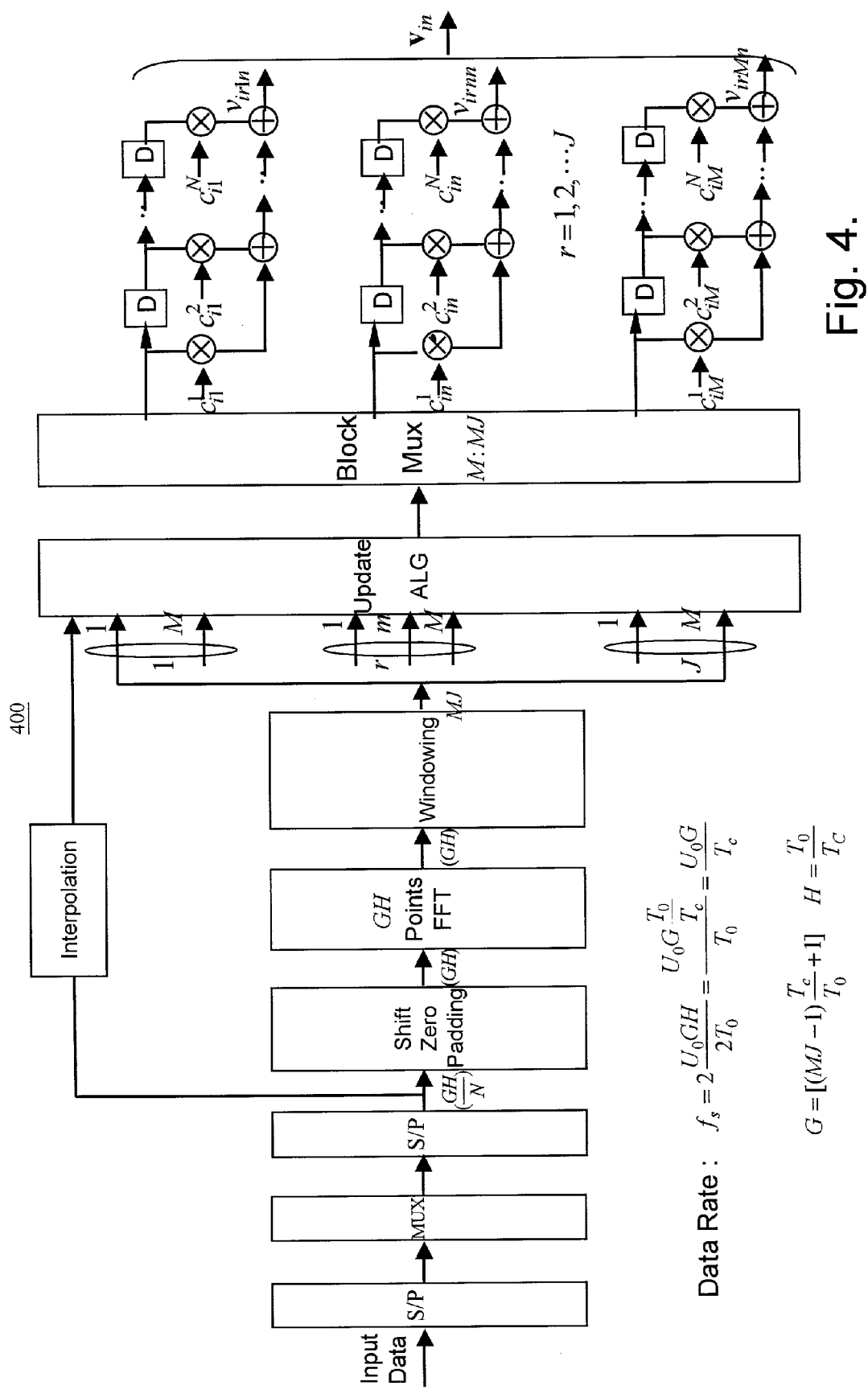
FIG. 4 is a block diagram illustrating a modified preprocessor of the programmable OFDM-CDMA synchronizer (as shown in FIG. 3) according to a further embodiment of the present invention.

FIG. 4 is a block diagram illustrating a modified preprocessor of the programmable OFDM-CDMA synchronizer (as shown in FIG. 3) according to a further embodiment of the present invention with the additional blocks "S/P", "interpolation" and "Mux." The block "Update ALG" for the update algorithm is discussed herein and below in further detail.

The preprocessor or receiver structure shown in FIG. 4 can be used in place of the preprocessor 390 (including the RAKE receiver) of the system 300 shown in FIG. 3. Because the fundamental structure of preprocessor 400 shown in FIG. 4 is the generally the same as that of the programmable OFDM-CDMA receiver shown in FIGS. 1 and 3, the linear synchronization structure for used in an OFDM-CDMA system as shown in FIG. 4 is advantageously and optimally programmable. A system according to the principles of the invention can be programmed to MC-CDMA, MC-DS-CDMA, or MT-CDMA, which are described in further detail herein and below. Parameter settings are summarized in FIG. 3, which can be applied to either the receiver structure of FIG. 1 or 4.

For programming the MC-CDMA, an MC-CDMA transmitter spreads the original data stream over different sub-carriers using a given spreading code in the frequency domain. The original stream with each data having a predetermined duration $T_s$ is serial-to-parallel (S/P) converted into groups of J data sub-streams with duration $T=J\,T_s$. A sequence of length M constitutes the spreading codes for user k. M identical branches copied from the data sub-streams for each group are then multiplied by the corresponding bit of the spreading codes. Each branch modulates a subcarrier for transmission. The separation between adjacent sub-carriers equals 1/T to satisfy the condition for orthogonality with minimum frequency separation.

According to the invention, provided that $U=U_0GH$, the inverse of adjacent subcarriers separation is set to $T_0=T_c=T$, and the data sampling rate is $f_s=U_0MJ/T_o=U_0M/T'$. The two blocks "shift zero padding" and "windowing" are not needed for H=1 and GH=MJ. The tapped-delay-lines regress is one-tap (N=1), i.e., $c_{km}^l = c_k^m$ for m=1,2, ... M. The correlation matrix $R^{MC}$ is chosen with.

$$R^{MC}_{kjmlu,k'j'm't'u'}[p-p'] = (c_k^m)^* c_{k'}^{m'}$$
$$\int_{-\infty}^{+\infty} \Pi(t-pT-\psi_u-t_{kl})\Pi(t-p'T-\psi_{u'}-t_{k'l'})e^{-i2\frac{2\pi}{T}((j-r)+J(m-s)t}dt,$$

where $\Pi(t)=1$ for $t\in[0,T]$ and $\Pi(t)=0$.

For programming the MC-DS-CDMA, the MC-DS-CDMA transmitter spreads the S/P converted data streams using given spreading codes in the time domain so that the subcarriers are orthogonal with a minimum frequency separation. The original data stream with symbol duration $T_s$ is S/P converted to J groups of data streams with symbol duration $T=MJT_s$. Each data stream is then divided into M identical branches and then being spread by the same Spreading codes. Each branch modulates a subcarrier for transmission. The separation between adjacent carriers satisfies the condition for orthogonality with minimum frequency separation.

As $T_0=T_c=T/N_{MD}$ and $f_s=U_0MJ/T_c=U_0N_{MD}/T'$, the "shift zero padding" and "windowing" are not needed because H=1 and GH=MJ. The weighting coefficients are generally identical for all tapped-delay-lines, i.e., $c_{km}^n = c_k^n$, n=1,2 ... $N_{MD}$. The correlation matrix $R^{MD}$ is chosen with:

$$R^{MD}_{kjmlu,k'j'm't'u'}[p-p'] =$$
$$\int_{-\infty}^{+\infty} \Big(c_{km}^*\big((t-pT-\psi_u-t_{kl})c_{k'm'}(t-p'T-\psi_{u'}-t_{k'l'})$$
$$e^{-i\frac{2\pi N_{MD}}{T}((j-r)+J(m-s)t}dt.$$

For programming the MT-CDMA, the MT-CDMA transmitter spreads the S/P converted data streams using a given spreading code in the time domain so that the spectrum on sub-carriers have minimum frequency separation. In MT-CDMA, the original data stream with symbol duration $T_s$ is S/P converted to data streams with symbol duration $T=JT_s$. The S/P converted data streams are then spread by the same signature waveform. Each branch modulates a subcarrier for transmission. The separation between adjacent carriers satisfies the condition for orthogonality with respect to the symbol before spreading.

For the MT-CDMA in which M=1, $T_0=T$ and $f_s=U_0GH/T=U_0$ GH/JT', and $c_{kl}^n=c_k^n$ for n=1,2, ... $N_{MT}$. The correlation matrix $R^{MT}$ is chosen with:

$$R^{MT}_{kjlu,k'j'l'u'}[p-p'] =$$
$$\int_{-\infty}^{+\infty} \Big(c_k^*(t-pT-\psi_u-t_{kl})c_{k'}(t-p'T-\psi_{u'}-t_{k'l'})e^{-i(\frac{2\pi}{T}(j-r)t}dt.$$

Since $v_u$ and $v_{u+a}$ are correlated for a=1,2, ... U–1, some repeated processings are avoidable which are remedied by an update algorithm according to the invention. Given a sequence $\{x_0, x_1, \ldots, x_{N-1}, x_N, \ldots x_{2N-1}\}$, $y^m$ in terms of $y^0$ and other parameters are obtained, where $y^m$ is an N-vector representing the N-point discrete Fourier transform (DFT) of $x^m=\{x_m, x_{m+1}, \ldots, x_{m+N-1}\}^T$. The N-point DFT of $$x^m \text{ is } y_k^m = \sum_{n=0}^{N-1} x_{n+m} W^{nk}, \text{ where } W = e^{-i\frac{2\pi}{N}}. \text{ Thus,} \quad (10)$$

$$y_k^m = \sum_{n=0}^{N-1} x_{n+m} W^{nk} = \sum_{n=m}^{m+N-1} x_n W^{(n-m)k}$$

$$= W^{-mk}\left(y_k^0 + \sum_{n=0}^{m-1}(x_{n+N}-x_n)W^{nk}\right).$$

Therefore, $y_m$ can be obtained in terms of $y^0$ and $\{x_n, x_{n+N}:n=0,10 \ldots m-1\}$ by (10). Given the old data $\{x_0, x_1, \ldots, x_{m-1}\}$ and the updating data $\{x_N, x_{N+1}, \ldots, x_{N+m-1}\}$, $y^m$ can be obtained in terms of $y^0$ without directly computing the DFT of $x^m$.

Figure 5:
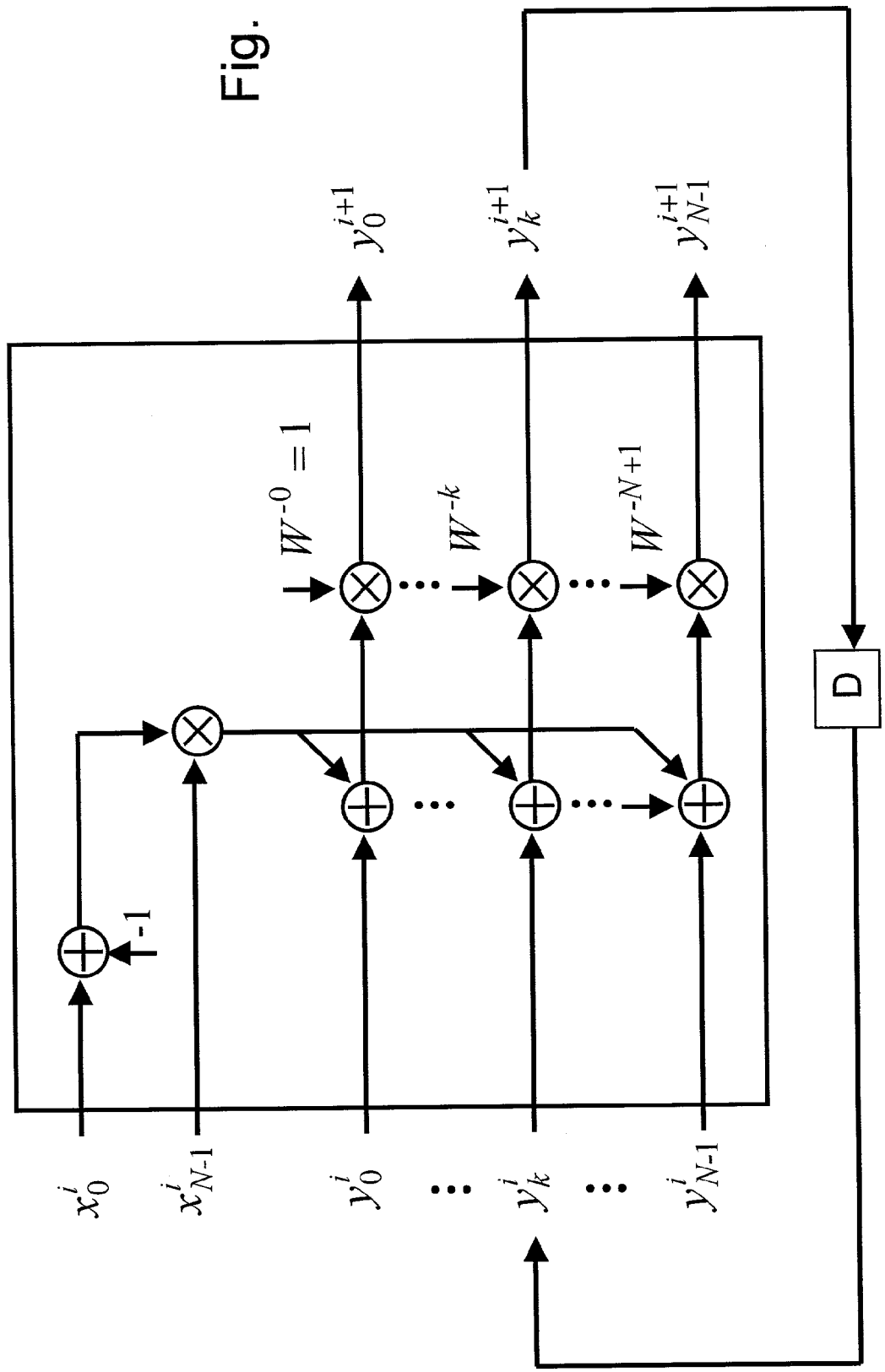
FIG. 5 is a block diagram illustrating an exemplary structure of an update algorithm according to the invention.

Provided that the number of the discrete timing $U=U_0GH$, only the case where m=1 is considered in equation (10), where for k=0,1, ... GH–1, $y_k^{i+1}=W^{-k}(y_k^i+x_{n+N}-x_n)$. The structure for the update algorithm is shown in FIG. 5. When GH cannot divide U or U cannot divide GH, additional interpolations are required. For practical applications, it is preferred that the GH and U design parameters are set such that either can divide the other.

In accordance with the programmable multiuser synchronization structure for the OFDM-CDMA according to the invention, programmability is advantageously preserve since the parameters needed for estimation can be obtained using a programmable receiver structure shown either in FIG. 1 or 4.

Provided that the number of rays L=1, using equation (2), R can be regarded as a new cross-correlation matrix for imaginary users k=1,2, . . . , KJM with signature waveforms being $C_{k=kjm}(t)=c_k(t)\ e^{iw_{jm}t}$. The K-user OFDM-CDMA system can be considered as a special case of a KJM-user CDMA system with new signature waveforms generated from the original signature waveforms and the subcarriers. In CDMA, the modified mean square error for timing and complex amplitudes tends to zero as signal-to-noise ratio (SNR) tends to infinity, i.e., near-far resistant. Characteristics for multiuser synchronization in CDMA are advantageously inherited by OFDM-CDMA. The programmable multiuser synchronization structure for OFDM-CDMA according to the invention is advantageously near-far resistant as well.

For the case of the programmable synchronizer being programmed to MC-DS CDMA, a scenario having a 4-user, 1-independent subcarrier, 4-dependent subcarrier ((K,J,M)=(4,1,4)) is considered, with the length of training sequences being 2P+1=1. The number of subcarriers JM=4 is selected such that the signal undergoes flat fading (L=1) on each subchannel and kjml are identically and independently distributed with variance $1/(JM)=1/4$. The discrete timings are $\psi_u=ulT=ul(MT)=ul(4T)$, for u=0, . . . , 3 and are uniformly distributed. Gold codes of length 15 are used with applications in BLUE, LMMSE and MRC.

Figure 6:
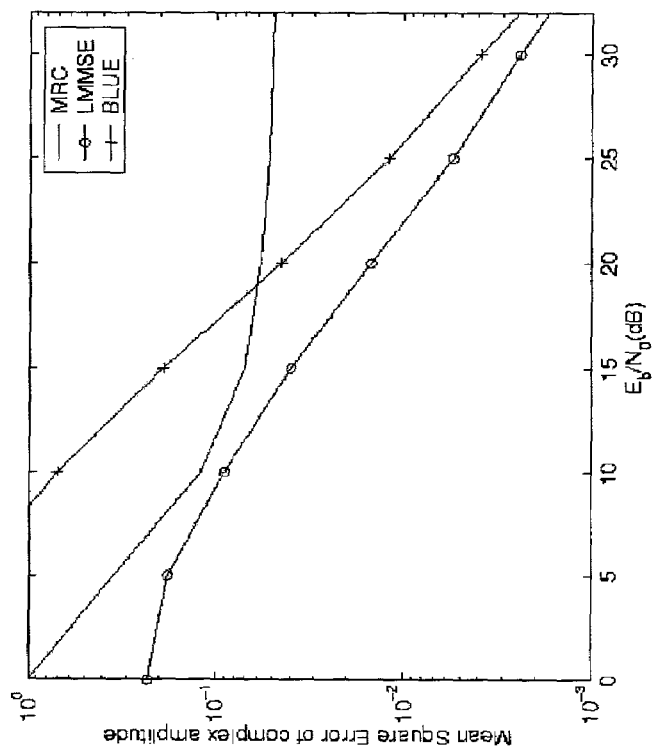
FIG. 6 is a diagram illustrating the results of simulations in a system according to the invention.
Figure 6:
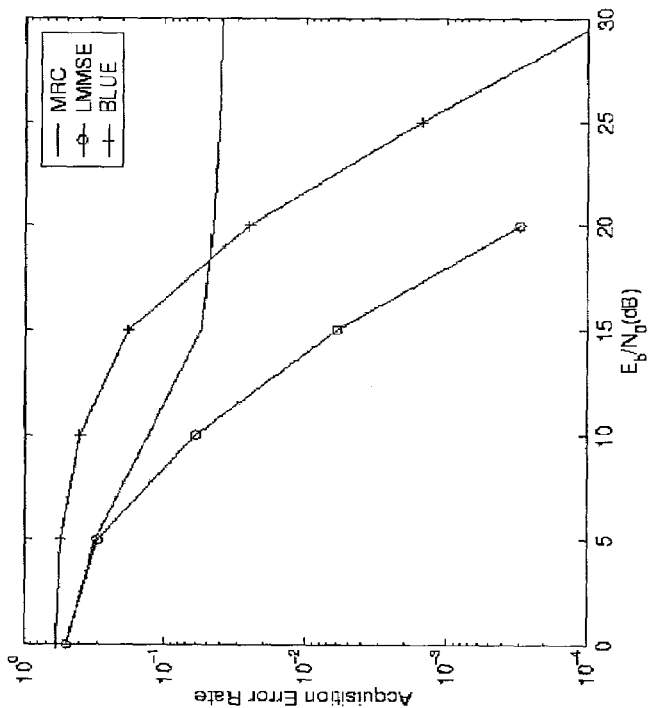

FIG. 6 shows the acquisition error rate and mean square error of the complex amplitude in different SNRs, which verify that the BLUE and LMMSE are near-far resistant in a frequency selective fading channel. When the SNR is high, the performance of BLUE is close or better than LMMSE. Quite different from multiuser detection, the linear operator $A_{BL}$ is deterministic in multiuser synchronization. The complexity of $o(N^2)$ is evident where N is the size of $A_{BL}$. Therefore, BLUE is preferred for its low complexity as opposed to LMMSE. Conversely, for the LMMSE estimator, a collection of data can be stored regarding $A_{ms}(C_\zeta, \sigma^2)$ in the hardware using empirical estimates of $C_\zeta$ and $\sigma^2$. Once the $C_\zeta$ and $\sigma^2$ are determined, $A_{ms}(C_\zeta, \sigma^2)$ can be chosen from the database.

The value of the reference matrix D (or reference sequences $d_{kj}[p]$) is not specifically assigned. The reference matrix D can be selected such that $J^H D^H RDJ$ is diagonal. If this is the case, then based on equation (2), the single user approach in equation (7) becomes the optimum approach.

Hence, a linear complexity programmable multiuser synchronization structure for OFDM-CDMA is advantageously developed to enhance system performance in accordance with the invention. In addition to the BLUE and LMMSE estimators considered for estimating $\zeta$ here, other types of estimators can be derived accordingly. An update algorithm according to the invention is further described to avoid irrelevant computations of FFT. The synchronization structure is advantageous in that the OFDM-CDMA according to the invention includes more imaginary users with verified, simulated optimal performance. The low-complexity BLUE performs well at high SNR. The LMMSE outperforms BLUE and MRC, and with the database-lookup approach, its complexity is as low as that of BLUE. The reference matrix D can be selected such that $J^H D^H RDJ$ is generally diagonal where the number of computations is significantly reduced.

While the above is a full description of the specific embodiments, various modifications, alternative constructions and equivalents may be used. For example, the process steps of the method according to the invention will include methods including substantially the same process steps as the method of the invention to achieve substantially the same result. Therefore, the above description and illustrations should not be taken as limiting the scope of the present invention which is further defined by the appended claims.

We claim:

1. An apparatus for deriving a plurality output signals from a plurality of received signals at an OFDM-CDMA communications system, comprising:
    a preprocessor, responsive to the plurality of received signals, operative to produce an observation vector;
    a postprocessor coupled to the preprocessor for linearly deriving at least one of a plurality of synchronization parameters in response to said observation vector; and
    a programmable multiuser detector producing a plurality of output signals in response to the at least one of the plurality of synchronization parameters derived from the post processor; and
    a selection control for selectively configuring the communications system to operate as at least one of the following types of communication systems: a) Multi-Carrier CDMA, b) Multi-Carrier Direct Sequence CDMA, and c) Multi-Tone CDMA.

2. The apparatus of claim 1 wherein the plurality of synchronization parameters comprises one or more of the following parameters: a) timing parameters, b) amplitude parameters, and c) carrier phase parameters associated with the plurality of received signals.

3. The apparatus of claim 1 wherein the preprocessor comprises a RAKE OFDM-CDMA receiver.

4. The apparatus of claim 3 wherein the RAKE OFDM-CDM receiver comprises:
    a synchronous circuit operative to receive the plurality of received signals;
    a plurality of delay elements for delaying a plurality of signals output from the synchronous circuits to form a plurality of delayed signals;
    a plurality of fingers operative to receive the plurality of delayed signals; and
    a detector responsive to a plurality of signals output from the plurality of fingers and an output from a channel estimation block to produce a detection output.

5. The apparatus of claim 1 wherein the preprocessor comprises:
    an update algorithm wherein results of Discrete Fourier Transform (DFT) of certain parameters may be obtained without direct DFT computation for increasing computational efficiency.

6. The apparatus of claim 5 wherein results are obtained by linearly combing old parameters with new parameters of the certain parameters.

7. The apparatus of claim 1 wherein the postprocessor further comprising a linear estimator.

8. The apparatus of claim 7 wherein the linear estimator is based on linear minimum mean square error (LMMSE).

9. The apparatus of claim 7 wherein the linear estimator is a best linear unbiased estimator (BLUE).

10. A synchronization method for an OFDM-CDMA communications system comprising the steps of:
    producing an observation vector in response to a plurality of received OFDM-CDMA signals;

linearly deriving at least one of a plurality of synchronization parameters in response to the observation vector; and detecting the plurality of output signals, in response to at least one of the plurality of synchronization parameters; and selectively configuring the communications system to operate as one of following types of communication system: a) Multi-Carrier CDMA, b) Multi-Carrier Direct Sequence CDMA, and c) Multi-Tone CDMA.

11. The synchronization method of claim 9 wherein the plurality of synchronization parameters comprises one or more of following parameters a) timing parameters, b) amplitude parameters, and c) phase parameters.

12. The method of claim 10 wherein the producing step is performed by a RAKE OFDM-CDM receiver.

13. The method of claim 12 wherein the RAKE OFDM-CDM receiver comprises:
 a synchronous circuit operative to receive the plurality of received signals;
 a plurality of delay elements for delaying a plurality of output signals from the synchronous circuit to form a plurality of delayed signals;
 a plurality of fingers operative to receive the plurality of delayed signals and produce a plurality of output signals and;
 a detector responsive to the plurality of output signals from the plurality of fingers and an output from a channel estimation block to produce a detection output.

14. The method of claim 10 wherein the producing step further comprises the step of calculating results of Discrete Fourier Transform (DFT) of certain parameters without direct DFT computation for increasing computational efficiency.

15. A synchronizer for use in an OFDM-CDMA system comprising:
 a receiver operative to process a plurality of OFDM-CDMA signals;
 a database operative to store and provide a plurality of correlation matrixes; and
 a linearly programmable estimator coupled to said database operative to produce at least one of a plurality of synchronization parameters in response to the plurality of processed OFDM-CDMA signals, wherein the linearly programmable estimator selectively configures the OFDM-CDMA system to operate as at least one of a Multi-Carrier CDMA, a Multi-Carrier Direct Sequence CDMA, and a Multi-Tone CDMA.

16. The synchronizer of claim 15 wherein the estimator is one of: a) a linear minimum mean square error (LMMSE) estimator and b) a best linear unbiased estimator (BLUE).

17. The method claim 16 wherein the results are obtained by linearly combing previously obtained ones of the synchronization parameters with newly obtained ones of the synchronization parameters.

18. The synchronizer of claim 15 wherein the plurality of synchronization parameters comprise one or more of following parameters: a) timing parameters, b) amplitude parameters, and c) carrier phase parameters.

19. An OFDM-CDMA system for deriving a plurality output signals from a plurality of received OFDM-CDMA signals, comprising:
 means for deriving an observation vector during a training interval in response to the plurality of received OFDM-CDMA signals;
 means for linearly deriving at least one of a plurality of synchronization parameters in response to the observation vector during the training interval; and
 means for producing a plurality of output signals corresponding to the plurality of received OFDM-CDMA signals after the training interval in response to the at least one of the plurality of synchronization parameters and the observation vector; and
 means for selectively configuring said system to operate as one selected from the group consisting of Multi-Carrier CDMA, Multi-Carrier Direct Sequence CDMA, and Multi-Tone CDMA.

* * * * *